United States Patent Office 3,053,687
Patented Sept. 11, 1962

3,053,687
METHOD OF BONDING
William J. Bobear, Latham, N.Y., assignor to General Electric Company, a corporation of New York
No Drawing. Filed Nov. 27, 1959, Ser. No. 855,524
5 Claims. (Cl. 117—76)

The present invention relates generally to a method of bonding glass fabric substrates with silicone rubber and to the product produced by such method. More particularly, the present invention relates to an improved method of bonding organopolysiloxane resin sized glass cloth substrates, such as a biased glass cloth, to a wide variety of silicone rubbers to produce numerous products, such as, for example, extensible semi-cured tapes, gaskets and electrical insulating materials of superior performance.

The glass fiber industry has long been interested in making certain organopolysiloxane resin sized biased glass cloth silicone rubber tapes for electrical applications having superior heat resistance and improved insulating characteristics, but prior to the present invention it has not been feasible to achieve superior bond strength between the glass cloth substrate and the silicone rubber base.

In order to produce such a tape, it has been necessary to utilize a suitable glass cloth size to provide dimensional stability to the biased glass cloth; otherwise, the cloth tends to stretch and neck in the coating towers. The available organic resin sizes were suitable with organic resin coatings, but they lacked satisfactory insulating and heat aging properties and could not be smoothly bonded to silicone materials. The subsequent development of water soluble organo-substituted resin sizes free of aliphatic unsaturation provided for improved bonding between silicone materials and resin sized glass cloth resulting in the increased availability of certain types of reinforced silicone rubber tapes of superior performance.

Under extreme operating conditions, particularly in sealed systems such as cables and the like, silicone rubber tends to revert, i.e., soften or even flow. One factor affecting the degree of reversion is the type of filler that is incorporated in the organopolysiloxane elastomer during the processing of the rubber. It is known, for example, that fume silica filler, unlike other reinforcing fillers, such as precipitated silica and the like, imparts substantial reversion resistance to the elastomer. Unfortunately, the bond strength between a fume silica containing reinforced rubber and a glass substrate sized with an organo-substituted polysiloxane resin free from aliphatic unsaturation is so weak that the silicone rubber can be cleanly peeled from the glass substrate with little or no effort.

It has now been discovered that superior bond strength is achieved between a silicone rubber and a glass fabric base sized with an organo-substituted polysiloxane resin free from aliphatic unsaturation, including a silicone rubber reinforced with a filler containing at least a major proportion of fume silica, by priming the resin sized glass substrate, prior to bonding to the silicone rubber base with an organoborate, such as triphenylborate.

The present invention provides a method of bonding a glass fabric substrate with a silicone rubber. In accordance with the present invention, the substrate which is sized with an organopolysiloxane resin free of aliphatic unsaturation is bonded to a convertible organopolysiloxane composition reinforced with a filler containing at least a major proportion of fume silica. The process comprises the steps of (1) priming the glass substrate sized with an organopolysiloxane resin free from aliphatic unsaturation with an organoborate (2) treating the primed product with a convertible organopolysiloxane which contains a curing agent and a semi-reinforcing filler (3) curing the resulting convertible organopolysiloxane treated product at temperatures in the range of 80° C. to 250° C., and (4) bonding the cured organopolysiloxane treated product to the convertible organopolysiloxane composition which contains at least a major proportion of fume silica filler, at temperatures in the range of 80 to 300° C. and at pressures up to 150 p.s.i., the convertible organopolysiloxane of (2) and (4) above being convertible to the cured solid elastic state, having a viscosity of at least 100,000 centipoises when measured at 25° C. and containing an average of from 1.95 to 2.05 organic groups per silicon atom, the organic groups being selected from the class consisting of methyl, ethyl, propyl, vinyl, allyl, phenyl, tolyl, xylyl, benzyl, phenylethyl, naphthyl, and chlorophenyl and at least 50 percent of the organic groups being methyl.

The convertible organopolysiloxanes used in the present invention are well known in the art. Attention is directed to the convertible organopolysiloxanes that are disclosed, for example, in Agens Patent 2,448,756 and Sprung et al. Patent 2,448,556, the latter two patents being issued September 7, 1948; Sprung Patent 2,484,595 issued October 11, 1949; Krieble et al. Patent 2,457,688 issued December 28, 1948; Marsden Patent 2,521,528 issued September 5, 1950—all the foregoing patents being assigned to the same assignee as the present invention; Hyde Patent 2,490,357 issued December 5, 1949; and Warrick Patent 2,541,137 issued February 13, 1951.

The particular convertible organopolysiloxanes used are not critical and may be any one of those described in the foregoing patents. They may be viscous masses or gummy solids depending upon the state of condensation of the starting organopolysiloxanes, polymerizing agent, etc., and may be prepared by condensation of a liquid organopolysiloxane containing an average of from about 1.95, preferably from about 1.98 to about 2.05 organic groups per silicon atom. The polymerizing agents which may be employed are well known in the art and may include, for instance, ferric chloride hexahydrate, phenyl phosphoryl chloride; alkaline condensing agents, such as potassium hydroxide, sodium hydroxide, etc. Each convertible organopolysiloxane generally comprises a polymeric diorganosiloxane which may contain, if desired, for example, up to 2 mole percent copolymerized monoorganosiloxane, for example, copolymerized monomethylsiloxane and a small molar (e.g., less than 1 mole) percent of triorganosiloxy units, e.g., trimethylsiloxy units. Generally, it is preferable to use as the starting liquid organopolysiloxanes (or mixtures of organopolysiloxanes) from which the convertible, for example, heat-convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl groups. The convertible organopolysiloxane thus prepared also advantageously contains silicon atoms to which at least 50 percent of the hydrocarbon groups attached thereto are lower alkyl radicals, e.g., methyl radicals.

The starting organopolysiloxanes used to make the convertible organopolysiloxanes advantageously comprise organic constituents consisting essentially of monovalent organic radicals attached to silicon by carbon silicon linkages, and in which essentially all the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane may be one in which all the siloxane units are $(CH_3)_2SiO$, or the siloxane may be a copolymer of dimethylsiloxane with a minor amount (e.g., from 1 to 20 or more mole percent) of any of the following units, alone or in combination therewith; $C_6H_5(CH_3)SiO$ and $(C_6H_5)_2SiO$. The presence of halogen, e.g., chlorine, atoms on the phenyl nucleus is not precluded.

Where alkenyl groups are attached to silicon by carbon-silicon linkages, it is preferable that the alkenyl groups (for instance, vinyl groups, allyl groups, etc.) be present in an amount equal to from 0.05 to 2 mole percent of the total number of silicon-bonded organic groups in the convertible organopolysiloxane.

The fillers employed with the convertible organopolysiloxanes utilized in the practice of the present invention are known to the art as reinforcing and semi-reinforcing fillers. The reinforcing fillers, such as the silica fillers, are structure inducing, and depending upon their manufacture, may contain or be free of hydroxyl groups either in the form of adsorbed moisture or bonded to silicon atoms. These structure inducing silica fillers may be additionally modified such as, for example, by the introduction of silicon-bonded alkoxy groups in place of some of the hydroxyl groups, resulting in decreased structure and knit time, when incorporated with a convertible organopolysiloxane composition. The preferred silica filler of the present invention is a fume silica filler made by fuming processes including the vapor phase burning of silicon tetra chloride or ethyl silicate, an example of such silica filler being the product commercially available to the trade known as Cab-O-Sil. Since a fume silica contains a relatively low degree of moisture it is particularly valuable as a filler additive in electrical applications and those requiring a high resistance to reversion. Examples of other silica reinforcing fillers may be found described in U.S. Patents 2,541,137, 2,610,167 and 2,657,149. Such fillers may be slightly acidic or alkaline (i.e. have pH's below or above 7) depending upon the method of manufacture such as by an aerosol-aerogel process. Examples of semi-reinforcing or usually non-structure forming types are titanium dioxide, lithopone, calcium carbonate, iron oxide, and diatomaceous earth.

The amount of filler or mixtures thereof used in combination with the convertible organopolysiloxanes may obviously be varied within wide limits, for instance, from about 10 to 300 percent, by weight, of the filler based on the weight of the convertible organopolysiloxane. The exact amount of filler used will depend upon such factors as, for instance, the application for which the convertible organopolysiloxane is intended, the type of filler employed (e.g., density of the filler), the type of convertible organopolysiloxane employed, etc. Examples of other fillers which may be incorporated in combination with the above fillers may be, for instance, titanium dioxide, lithopone, zinc oxide, zirconium silicate, iron oxide, and calcium carbonate.

Various curing agents to effect more rapid conversion of the convertible organopolysiloxane to the cured, solid, elastic state may be incorporated. Among such curing agents may be mentioned, for instance, benzoyl peroxide, tertiary butylperbenzoate, bis-(2,4-dichlorobenzoyl) peroxide, etc. These curing agents (or "vulcanization accelerators" as they are often designated) may be present in amounts ranging from about 0.1 to as high as 4 to 8 percent or more, by weight, based on the weight of the convertible organopolysiloxane. High energy electron irradiation without curing agents may also be employed for vulcanizing purposes.

The organoborates employed in the practice of the present invention are reaction products of boric acid or hydroxylates thereof and can be defined by the following formula

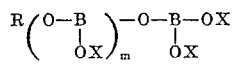

wherein $m$ is a whole number from 0 to 3, R is an organic group, and X is hydrogen or R. R can be further defined as a monovalent hydrocarbon group, halogenated monovalent hydrocarbon group and an amine-substituted monovalent hydrocarbon group. R can be more particularly defined as aryl, such as phenyl, naphthyl, tolyl, etc., cycloaliphatic, such as cyclopropane, cyclohexane, etc., alkyl such as methyl, ethyl, butyl, etc., alkenyl and alkynyl; chloroaryl such as chlorophenyl, chloronaphthyl, etc., chloroalkyl such as chloroethyl, chlorobutyl, etc., amine-substituted aryl such as tolyl amine, phenyl amine; amine-substituted alkyl such as ethylamine, propyl amine, isopropyl amine, and butyl amine.

Specific examples of the organoborate compounds used in the present invention include triphenyl borate, tri-n-butyl borate, triorthochlorophenyl borate, triethanolamine borate, and triisopropylamine borate.

In order to provide dimensional stability for biased glass fabric substrates, including composite fabrics of glass and synthetic materials including polyethylene terephthalate, a suitable glass size is necessary. The glass sizes found most suitable in the practice of the present invention are organopolysiloxane resin sizes free of aliphatic unsaturation such as taught by U.S. 2,258,218 and 2,258,220—Rochow, U.S. 2,438,478—Hyde and Belgian 557,059 Kranz.

The following method is illustrative of one preparation of a suitable water-soluble organopolysiloxane resin size material which can be employed in the practice of the present invention:

Isopropanol, 1.3 mols, are added to a blend of about one mole of methyltrichlorosilane mixed with phenyltrichlorosilane (resulting in a methyl/phenyl mole ratio of 9:1) with evolution of HCl gas. A mixture of two moles of glycerol and one mole of isopropanol are then added to the resulting isopropoxy silanes saturated with HCl. The product is distilled to a pot temperature of 150° C. during which operation exchange of alkoxy groups takes place as evidenced by recovery of isopropanol, leaving a nearly neutral syrupy residue. Traces of HCl are neutralized with calcium carbonate and the solids are filtered with the aid of Celite. The product is viscous and is thinned with 100 ml. isopropanol.

Suitable sized tapes may then be prepared by bias cutting 1 inch wide 128 glass cloth that has been heat cleaned, dipping the tapes in the size, draining for 2 minutes in air and curing for 5 minutes at 150° C.

In the practice of the invention, a suitable organopolysiloxane resin sized glass fabric substrate such as a sized biased glass cloth, is primed with an organo borate, by such methods as, for example, dipping, spraying or brushing the resin sized glass fabric substrate with an organic solvent solution of the organic borate. Examples of suitable organic solvents are toluene and xylene. If the substrate is primed with an organic solvent solution of the organoborate by dipping, concentrations between 1 to 20 percent are preferred depending on the solubility of the borate in the organic solvent. Dip time, moreover, can vary from about 10 to 15 seconds, or less, to as long as 30 minutes, depending on the concentration of the solution. The primed glass fabric substrate is then dried in any suitable manner, such as by exposure to air, or, if desired, by external heat. The primed substrate is then further treated with an organic solvent solution, (including organic solvents such as toluene, xylene, naphtha and the like) of an organopolysiloxane containing a semi-reinforcing filler and a curing agent, by dipping, spraying, etc., and the solvent is removed by air evaporation or like means. The treated glass fabric substrate is then curved at temperatures in the range of 80° C. to as high as 250° C. or higher depending on the type of curing agent employed.

The treated glass fabric substrate is then ready to bond to a suitable reinforced silicone rubber composition. A convenient method is to dip coat the cured surface treated glass fabric substrate with an organic solvent solution of the particular reinforced convertible organopolysiloxane selected. If it is desired to bond the surface treated glass fabric substrate to a reinforced fume silica containing organopolysiloxane, the organopolysiloxane should be bodied with a filler containing at least a major portion of a fume silica in order to make a silicone rubber-glass bonded product having high resistance to reversion.

The concentration of the dip solution will depend on such factors as the solubility characteristics of the organic solvent, the thickness of the coating desired, and the length of dip time. The resulting coated glass fabric substrate is then dried in any suitable manner and press cured at pressures ranging from contact pressure up to 150 p.s.i. and at temperatures in the range of 70° C. to 300° C. for as little as a few seconds to as long as thirty minutes or more depending on the conditions such as pressure and temperature and the bond strength desired.

In order that those skilled in the art may better understand how the present invention may be practiced, the following examples are given by way of illustration but not limitation. All parts are by weight.

EXAMPLE 1

A strip of resin sized bias glass cloth having an average thickness of about 7 mils was dipped into a 5 percent solution of triphenyl borate in toluene. The wet strip was then air dried. The primed glass cloth base was then coated with a 10 percent solution of a semi-reinforced dimethylpolysiloxane composition in xylene containing the following ingredients:

100 parts of dimethylpolysiloxane
50 parts of calcium carbonate
1 part of benzoyl peroxide The treated glass strip was then cured by heating it 10 minutes at 150° C. and 10 minutes at 250° C.

The cured substrate was then dipped in a 27.5 percent solution of a Cab-O-Sil containing organopolysiloxane in xylene having the following composition:

100 parts of dimethylpolysiloxane
40 parts of fume silica
2 parts of red iron oxide
4 parts of diphenylsilanediol
2 parts of benzoyl peroxide The fume silica bonding composition had been processed in a dough mixer for one hour at 110° C. to 115° C. before dispersing in xylene. The coated strip was then air dried and cut into two pieces. The halved sections were then bonded together in a press for 10 minutes at 150° C. at 100 p.s.i. forming a composite two ply tape having an average thickness of about 20 to 40 mills.

EXAMPLE 2

The same procedure was followed as in Example 1, except that a triorthochlorophenyl borate priming solution was applied to the resin sized glass substrate.

Controls were made with the resin sized bias cloth glass substrate and the fume silica containing bonding composition by omiting the organoborate priming step. One control, designated A, was made by dipping the resin sized bias cloth glass substrate directly into the organic solvent solution of the organopolysiloxane containing the fume silica reinforcing filler and bonding the dried product to the fume silica rubber as in Example 1. A second control, designated B, was made by initially dipping the resin sized glass substrate into the xylene solution of the semi-reinforced organopolysiloxane and curing the resulting treated product and then preparing a double ply fume silica reinforced rubber-glass tape as in Example 1.

A peel test was made to determine the bond strength between the glass cloth substrate and the reinforced fume silica containing silicone rubber coating with the control samples and the tapes of the present invention. One inch wide strips were peeled apart on a Scott tester, using a pull of 2 inches per minute. An adhesive type failure, i.e. a clean separation between glass and rubber would not be desirable as it would indicate a glass-rubber bond strength below the tear strength of the rubber. A cohesive type failure would be a positive indication of good bonding between glass and rubber as the rubber would tear before glass-rubber separation.

The following table illustrates the results of the test:

Table I

BOND STRENGTHS OF GLASS-FUME SILICA RUBBER TAPE SAMPLES

| | Priming (base resin treated glass) | B.S. (number linear in.) | Type Failure |
| --- | --- | --- | --- |
| Sample: | | | |
| A | None | 0.8 | Adhesive. |
| B | Semi-reinforced organopolysiloxane | 2.9 | Do. |
| Example 1 | Triphenyl borate and semi-reinforced organopolysiloxane | 8.3 | Cohesive. |
| Example 2 | Triorthochlorophenyl and semi-reinforced organopolysiloxane | 7.6 | Do. |

The above results clearly demonstrate the marked superiority in bond strengths of tapes produced in accordance with the present invention. The invention illustrates the production of improved semi-cured tapes which are ideally suitable for electrical applications requiring high temperature resistance by making possible the advantages of bonding fume silica reinforced silicone rubbers with bias cloth glass substrates. The present invention thus permits industry to take advantage of employing silicone rubber tapes without the problem of reversion and thus enhances the use of silicone rubber in the electrical industry and the unique properties of such products can be more fully utilized in areas not possible heretofore.

What I claim as new and desire to secure by Letters Patent of the United States is:

1. A method for making a composite tape by bonding (a) a glass-fiber-containing cloth sized with an organopolysiloxane resin free of aliphatic unsaturation to (b) a silicone rubber material containing a convertible organopolysiloxane, a curing agent and a reinforcing filler which contains at least a major proportion of fume silica, said method comprising the steps of (1) priming the sized glass-fiber-containing cloth with an organo borate (2) treating the primed product of (1) with a convertible organopolysiloxane containing a curing agent and a semi-reinforcing filler, (3) curing the product of (2) at temperatures in the range of 80° C. to 250° C. and (4) bonding the product of (3) to the convertible organopolysiloxane composition of (b) at temperatures in the range of 80° C. to 300° C.; said convertible organopolysiloxanes being curable to the cured solid elastic state and containing an average of from 1.95 to 2.05 organic groups per silicon atom and at least 50 percent of the organic groups being methyl.

2. The method in accordance with claim 1, wherein the organoborate is triphenyl borate.

3. The method in accordance with claim 1, wherein the semi-reinforcing filler is calcium carbonate.

4. The method in accordance with claim 1, wherein the glass-fabric-containing cloth is biased and interwoven with synthetic organic fibers.

5. A semi-cured extensible tape produced by the method of claim 1.

References Cited in the file of this patent

UNITED STATES PATENTS

| | | |
| --- | --- | --- |
| 2,721,857 | Dickmann | Oct. 25, 1955 |
| 2,732,318 | Keil | Jan. 24, 1956 |
| 2,744,878 | Smith-Johannsen | May 8, 1956 |
| 2,751,314 | Keil | June 19, 1956 |
| 2,815,300 | Smith | Dec. 3, 1957 |
| 2,816,348 | Adamik | Dec. 17, 1957 |
| 2,843,555 | Berridge | July 15, 1958 |
| 2,851,439 | Clark | Sept. 9, 1958 |
| 2,859,202 | Bobear | Nov. 4, 1958 |
| 2,938,009 | Lucas | May 24, 1960 |